United States Patent [19]
Vlaanderen et al.

[11] Patent Number: 5,094,309
[45] Date of Patent: Mar. 10, 1992

[54] ACCESSORY FOR MOUNTING AN ENGINE DRIVEN COMPONENT TO A VEHICLE FRAME

[75] Inventors: James Vlaanderen, Garner; Larry D. Schuver, Goodell, both of Iowa

[73] Assignee: Iowa Mold Tooling, Inc., Garner, Iowa

[21] Appl. No.: 336,523

[22] Filed: Apr. 11, 1989

Related U.S. Application Data

[63] Continuation of Ser. No. 158,554, Feb. 22, 1988, abandoned.

[51] Int. Cl.$^5$ .............................................. B60K 25/02
[52] U.S. Cl. ..................................... 180/53.7; 180/53.8
[58] Field of Search ........................... 180/53.7, 53.8; 280/781, 785, 795; 474/135, 86; 293/132, 102

[56] References Cited

U.S. PATENT DOCUMENTS

| | | | |
|---|---|---|---|
| 1,277,166 | 8/1918 | York et al. | 474/86 |
| 2,325,729 | 8/1943 | Allin | 180/53.7 |
| 2,450,080 | 9/1948 | Burrell et al. | 180/53.7 |
| 2,875,746 | 3/1959 | Brice et al. | 180/53.8 |
| 3,282,368 | 11/1966 | Pittera | 180/53.7 |
| 3,296,892 | 1/1967 | Gibson | 474/86 |
| 3,371,543 | 3/1968 | Jackson et al. | 180/53.7 |
| 3,965,768 | 6/1976 | Foster | 474/135 |
| 4,601,683 | 7/1986 | Foster | 474/135 |

Primary Examiner—Charles A. Marmor
Assistant Examiner—Karin Tyson
Attorney, Agent, or Firm—Wood, Phillips, Mason, Recktenwald & VanSanten

[57] ABSTRACT

An accessory for attachment to the front end of a vehicle for mounting engine driven components 84, 86 to the vehicle including a frame extension and mounting platform 42 having a front end 48 and a rear end 50, apertures 60 for use in mounting the frame extension and mounting platform 42 to a vehicle frame 10, 12, additional apertures 52 at the front end 48 for use in securing a vehicle bumper 40 to the frame extension and mounting platform 42, still further apertures 92 for use in mounting at least one engine driven component 84, 86 to the frame extension and mounting platform 42, a transfer shaft 66 having an axis directed generally from front to rear of the frame extension and mounting platform 42, bearings 68 on the frame extension and mounting platform for journaling the transfer shaft 68, a transfer pulley 70 mounted on the transfer shaft 66 near the rear end 50 and adapted to be connected by a belt 72 to an engine 24 to be driven thereby, a further pulley 74 on the transfer shaft 66 for connection by belts 76, 78 to the input for engine driven components 84, 86 and a biasing device including an idler pulley 106 in alignment with the transfer pulley 70 for providing a biasing force to a belt 72 to thereby accommodate relative movement between a resiliently mounted engine 24 and the rigidly mounted frame extension and mounting platform 42.

14 Claims, 2 Drawing Sheets

ACCESSORY FOR MOUNTING AN ENGINE DRIVEN COMPONENT TO A VEHICLE FRAME

This is a continuation of application Ser. No. 158,554, filed Feb. 22, 1988, now abandoned.

FIELD OF THE INVENTION

This invention relates to an accessory for a motor vehicle, and more specifically, to an accessory for mounting an engine driven component such as a pump, compressor, winch or the like to a vehicle frame.

BACKGROUND OF THE INVENTION

Many uses of vehicles, particularly service vehicles, require provision for utilizing power developed by the vehicle engine for driving some sort of component such as a compressor, pump, generator, winch or the like, in addition to providing power for motive purposes. While in some cases the components are electrically driven by electrical motors powered by the vehicle electrical system, much higher levels of power to drive such components can be achieved by coupling the engine driven components mechanically or hydraulically to the engine mainshaft to be directly driven thereby.

Presently, direct coupling as mentioned immediately preceding is achieved in one of three basic ways. A first is so-called "underhood mounting". According to this method, a bracket is bolted to the engine block and in turn mounts a hydraulic pump, compressor or other engine driven component. The component is then driven by means of a belt connected to the engine mainshaft, frequently via an electrically operated clutch or the like. While this method works well for its intended purpose, many modern vehicles have insufficient space under the hood in which the engine driven component can be suitably installed, particularly when the component is a large capacity device.

A second method is to utilize a so-called "PTO" or power take-off. In this form, a PTO unit is bolted to the vehicle transmission. A hydraulic pump or a drive shaft connected to the PTO is used to drive the engine driven component by means of a hydraulic motor or a direct mechanical connection respectively. This system again works well for its intended purposes but is generally limited to relatively large vehicles whose transmissions are provided with a PTO unit. Thus, this method is not universally applicable because many smaller vehicles do not have a PTO.

A third method is the use of a so-called split shaft transmission. The main drive shaft of the vehicle is split and a split shaft transmission device placed in line between the two parts of the drive shaft. The split shaft transmission device provides PTO outlets and allows disconnection of the engine from the drive wheels of the vehicle to operate PTO outlets. Again, this method works well but it is complicated and expensive.

SUMMARY OF THE INVENTION

It is the principal object of the invention to provide a new and improved accessory whereby engine driven components may be installed on a vehicle. More specifically, it is an object of the invention to provide such an accessory that may be easily installed and has virtual universal applicability to vehicles of all types and sizes.

An exemplary embodiment of the invention achieves the foregoing object in an accessory that is adapted to be attached to the front end of a vehicle frame between the vehicle bumper and the main portion of the vehicle to mount an engine driven component to the vehicle. The accessory includes a frame extension and mounting platform having a front end and a rear end. First means at the rear end are provided for mounting the frame extension and mounting platform to the front of a vehicle frame. Second means are located at the front end for securing a vehicle bumper to the frame extension and mounting platform. Third means intermediate the ends are provided for mounting at least one engine driven component to the frame extension and mounting platform. A transfer shaft having an axis is generally directed from front to rear of the frame extension and mounting platform and bearings on the frame extension and mounting platform journal the transfer shaft for rotation about its axis. A transfer pulley is mounted on a transfer shaft near the rear end and is adapted to be connected by a belt to the vehicle of the engine to be driven thereby. Means are provided on the transfer shaft for connecting the same to an input for an engine driven component and finally, means are located on the frame extension and mounting platform near the rear side thereof in alignment with the transfer pulley for providing a biasing force to a belt connected to the pulley.

As a consequence of the foregoing construction, the engine driven components may be frame mounted on the vehicle and yet through relatively inexpensive and simple mechanical means can be engine driven. Of particular significance is the fact that while the engine will typically be resiliently mounted on the vehicle frame, and will accordingly move relative thereto during operation, the accessory provides for such movement and allows it to occur while maintaining a positive drive from the engine to the transfer shaft and thus to any engine driven components associated therewith.

In a highly preferred embodiment, the frame extension and mounting platform is generally U-shaped, having a lower bight flanked by upstanding legs.

In a preferred embodiment, the first and second mounting means are located on the legs and the third mounting means is located on the bight.

Preferably, the bearings are mounted on the bight generally medially of the legs and between sets of the third mounting means.

In a preferred embodiment, the biasing means includes an idler pulley that is resiliently biased toward the belt or the transfer pulley. In one embodiment, the biasing means includes an arm movably mounted in proximity to a belt and has a portion movable toward and away from the belt. The idler pulley is journaled on such portion and engages the belt while resilient means bias the portion toward the belt. A dashpot is connected to the arm to accommodate shock resulting from changes in engine loading and/or engine speed.

In a highly preferred embodiment, the arm is movably mounted by means of a pivot intermediate its ends which extends to a mounting plate which is in turn is secured to the bight of the frame extension and mounting platform near the rear end thereof. The resilient means is preferably a spring and along with the dashpot is connected to the arm and to the mounting plate on the side of the pivot remote from the idler pulley.

Other objects and advantages will become apparent from the following specification taken in connection with the accompanying drawings.

DESCRIPTION OF THE PREFERRED EMBODIMENT

Figure 1:
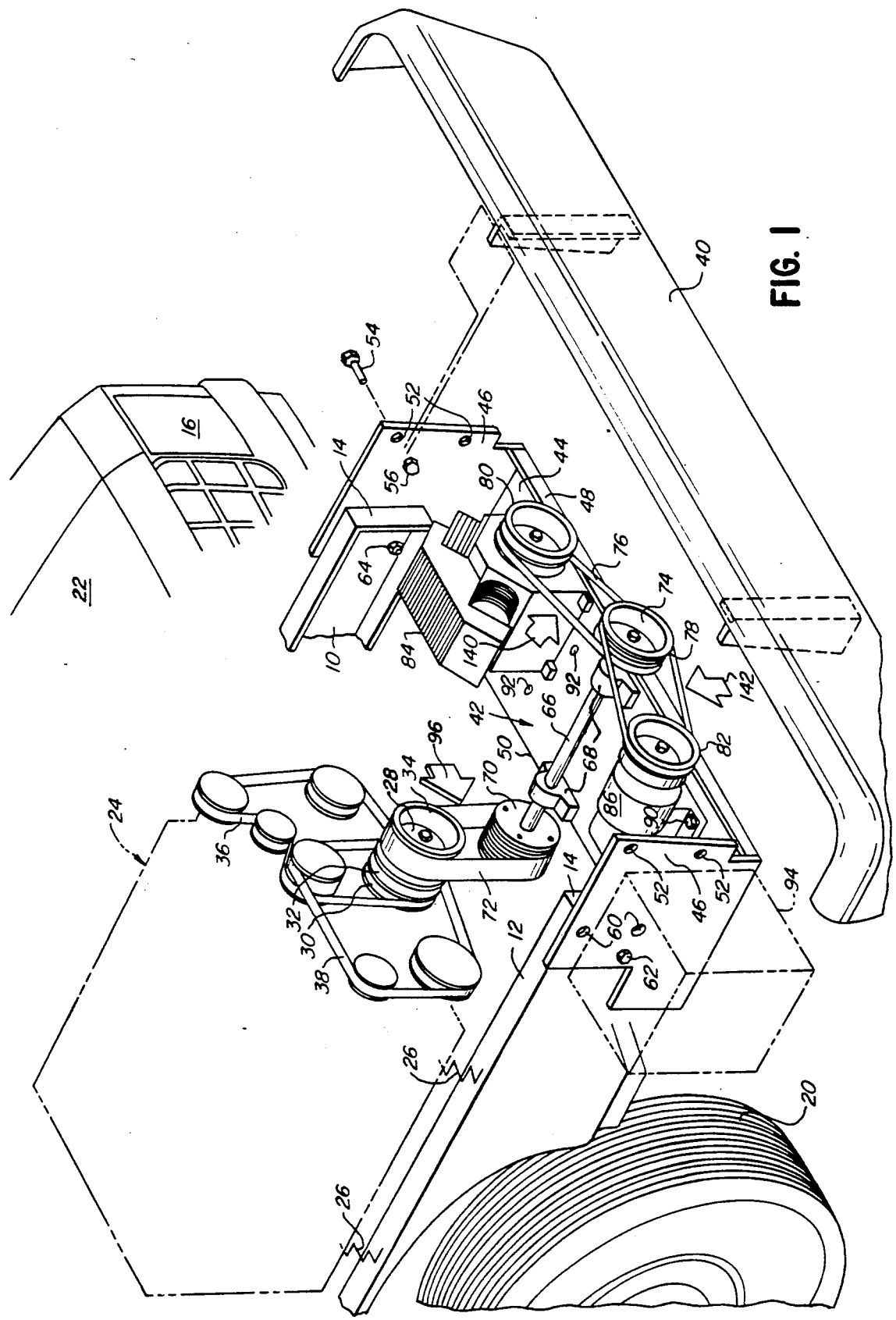
FIG. 1 is a fragmentary, perspective view of the front end of a vehicle illustrating the accessory of the invention mounted thereon, certain components being shown in exploded form or omitted for clarity.

An exemplary embodiment of a vehicle provided with an accessory made according to the invention is illustrated in the drawings and with reference to FIG. 1, the vehicle is seen to include spaced frame members 10 and 12 each having forwardly terminating ends 14 near the front 16 of a vehicle body, generally designated 18. Wheels 20 (only one of which is shown) are suitably mounted to the frame 10, 12 and the body 18 in a conventional fashion and form no part of the invention.

The body 18 includes a hood 22 and under the hood, an engine, generally designated 24 and shown in outline form, is located. As is well known, the engine 24 is connected to the frame 10, 12 by resilient elements or engine mounts shown schematically at 26. Such mounts are conventional and form no part of the invention.

The engine will typically include a forwardly extending mainshaft 28 upon which a plurality of pulleys 30, 32 and 34 are mounted to be driven thereby. Belts such as shown at 36 and 38 are utilized to drive various vehicular components as, for example, a power steering unit, an air conditioner, an alternator or the like, none of which are shown.

The vehicle will also include a front bumper 40 which normally would be secured to the ends 14 of the frame 10, 12. However, according to the invention, the accessory is interposed between the forward ends 14 of the frame 10, 12 and the bumper 40. The accessory includes a frame extension and mounting platform, generally designated 42. The frame extension and mounting platform 42 is generally U-shaped having a central, lower bight 44 flanked by two upstanding legs 46. The bight 44 has a length so as to substantially extend between the frame members 10, 12 and includes a forward end 48 and a rearward end 50. The legs 46, at the forward end 48 are provided with apertures 52 or the like for receipt of threaded fasteners such as bolts 54 provided with nuts 56 whereby the bumper 40 may be secured to the forward end 48 of the frame extension and mounting platform 42. Thus, the apertures 46 serve as a mounting means for the bumper although it will be readily appreciated that other forms of mounting means could be used if desired.

Near the rear side 50, each of the legs 46 is provided with a plurality of apertures 60 for receipt of bolts 62 to be captured by nuts 64 whereby the legs 46 may be secured to the forward end 14 of the frame 10, 12. Thus, the apertures 60 serve as a means for mounting the frame extension and mounting platform 42 to the frame 10, 12 of the vehicle.

The arrangement is such that the upper surface of the bight 44 which serves as the mounting platform as will be seen is below the mainshaft 28 of the engine 24 a sufficient distance that a transfer shaft 66 journaled in pillow block bearings 68 on the upper surface of the bight 44 may pass under the vehicle radiator (not shown). The shaft 66 extends generally from front to rear of the frame extension and mounting platform 22 and in the embodiment illustrated, past both the front side 48 and the rear side 50. At its rear end, the transfer shaft 66 mounts a transfer pulley 70 that is disposed below and aligned with the pulley 34 on the engine mainshaft 28 so that a belt 72 may be trained about both.

The opposite end of the transfer shaft 66 mounts a drive pulley 74 which may be connected by belts 76 and 78 which extend to respective electrically operated clutches 80 and 82 on the input shafts of an air compressor 84 and a hydraulic pump 86, respectively. Of course, engine driven components other than a compressor such as the compressor 84 or a hydraulic pump such as the hydraulic pump 86 could be driven by the belts 76 and 78 if desired. For example, a winch or an alternator could be so driven.

In any event, it should be appreciated from FIG. 1 that the shaft 66 extends generally medially of the frame extension and mounting platform 42 and the legs 46 thereof. As a consequence, there are locations on each side of the shaft 66 for receipt of engine driven components and the same may be secured thereto as by bolts 90 (only one of which is shown) extending through apertures 92 in the bight 44 to be captured by nuts (not shown). Thus, the apertures 92, which may be arranged in any desired pattern, serve as a mounting means for mounting engine driven components to the bight 44 of the frame extension and mounting platform 42.

In some instances, particularly where one of the engine driven components is a hydraulic pump such as the pump 86, a tank or reservoir shown in dotted lines at 94 may be mounted to one of the legs 46.

Figure 2:
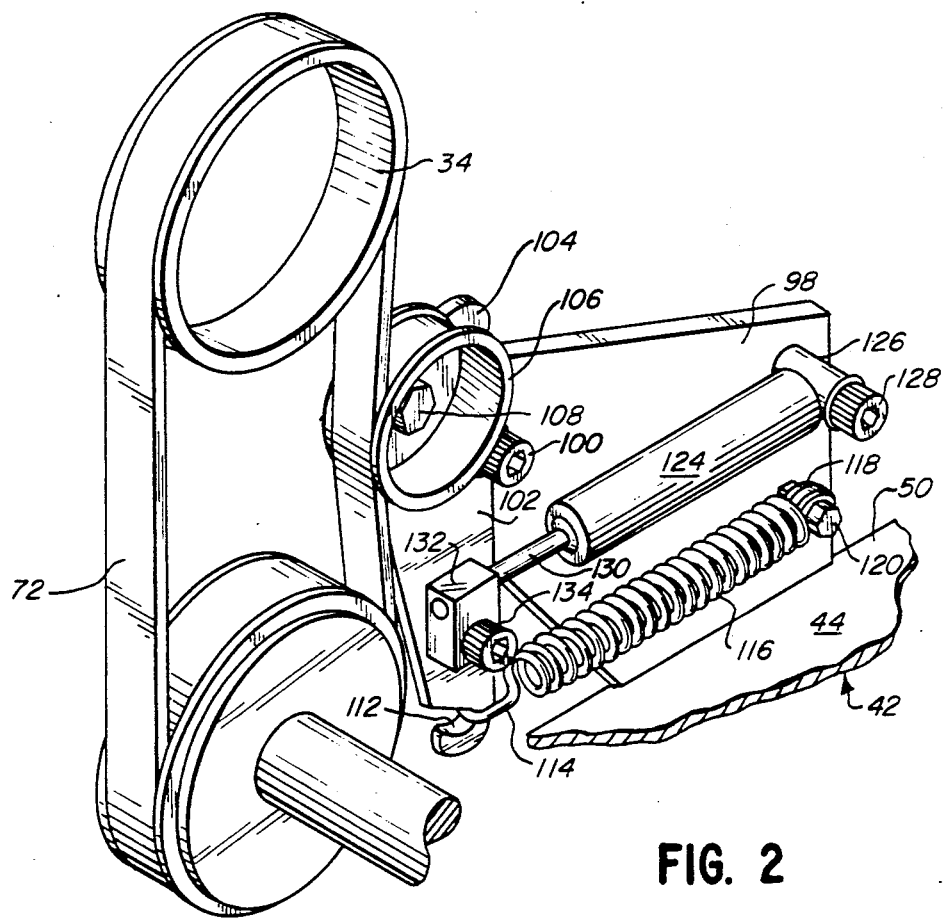
FIG. 2 is an enlarged, fragmentary perspective view of a biasing means utilized in the invention.
Figure 3:
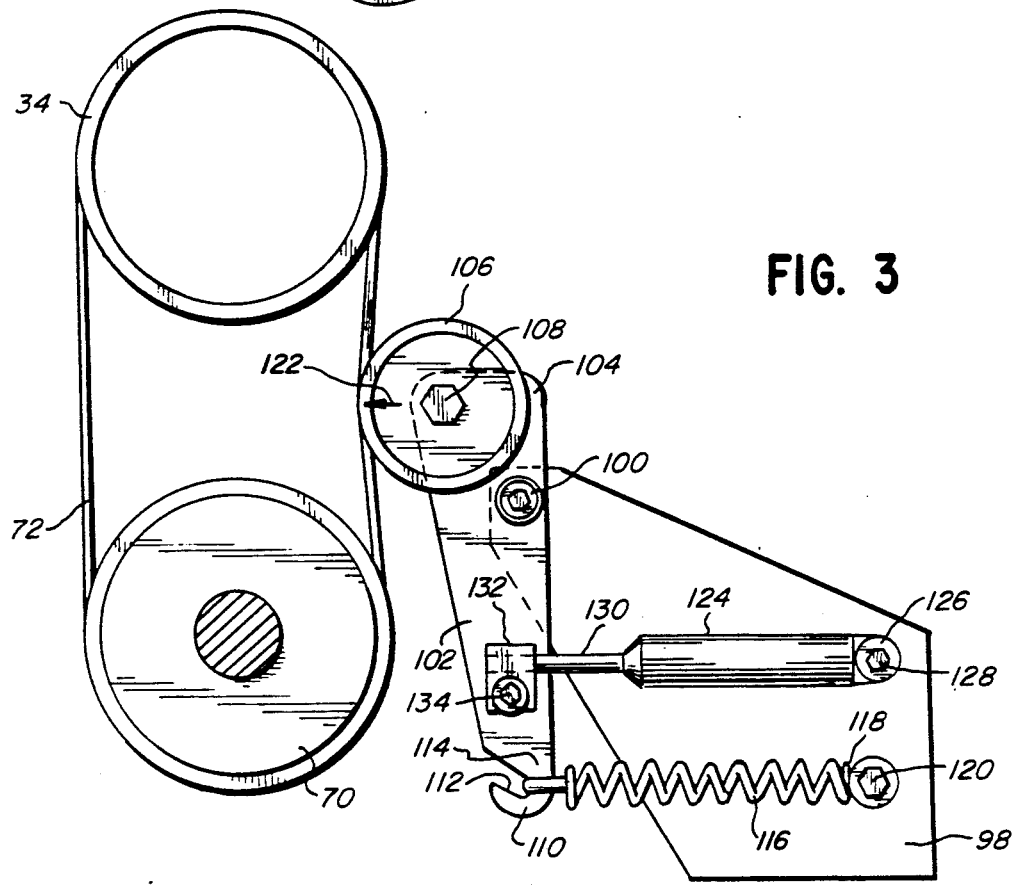
FIG. 3 is a side elevation of the biasing means.

From the foregoing description, it will be appreciated that the transfer shaft 66 is rigidly mounted to the frame 10, 12 whereas the engine 24 is not. Thus, in order to provide for relative movement that will occur between the transfer pulley 70 and the pulley 34 on the engine mainshaft 28, the belt 72 is sufficiently large so that it can extend between the pulleys 34 and 70 when they are at their most relatively remote positions. To take up slack in the belt 72 when the pulleys 34 and 70 are not at their relatively most remote positions, a biasing force is applied against the belt 72 between the pulleys 34 and 70 as illustrated schematically by an arrow 96 in FIG. 1. At this location, a biasing means is provided to provide such force and an exemplary embodiment of the biasing means is illustrated in FIGS. 2 and 3.

At the rear end 50 of the frame extension and mounting platform 42 and to one side of the transfer shaft 66, an upwardly extending mounting plate 98 is provided. The mounting plate 98, near its upper end, includes a pivot 100 which pivotally mounts an elongated arm 102 about an axis that is parallel to the axis of the transfer shaft 66. The pivot 100 is located intermediate the ends of the arm 102 and thus, the upper end 104 of the arm 102 may move toward and away from the belt 72 as well as the transfer pulley 70 as can be readily appreciated from FIGS. 2 and 3.

An idler pulley 106 is journaled on the upper end 104 of the arm 102 for rotation about an axis that is parallel to the axis of rotation of the shaft 66. A bolt-like axle 108 may be utilized for the purpose.

The lower end 110 of the arm 102 is notched at 112 so as to receive one end 114 of a tension spring 116. The opposite end 118 of the spring 116 is connected by a bolt 120 to the mounting plate 98. Thus, the spring 116 tends to bias the idler pulley 106 in the direction of an arrow 122 in FIG. 3, that is, against the belt 72.

To accommodate surges in the power train due to changing loading or engine acceleration or decelerations, a dashpot 124 in the form of a conventional shock absorber is included in the system. The housing end 126 of the dashpot 124 is connected by a pivot pin 128 to the mounting plate 98 while the rod end 130 of the dashpot 124 is connected by a clamp 132 and a pivot pin 134 to the lower end 110 of the arm 102.

In some instances, it may be desirable to tension the belts 76 and 78 in a similar fashion and structure similar to that just described may be employed to apply tensioning forces at the locations indicated by arrows 140 and 142 in FIG. 1.

From the foregoing, it will be appreciated that an accessory made according to the invention is ideally suited for installation on vehicles requiring engine driven components such as compressors, hydraulic pumps, winches, alternators, water pumps or the like. The system has virtual universal applicability because it is not dependent upon the existence of sufficient space under the hood in which to install the components nor is it such as to require a transmission with a PTO unit. The system is mechanically simple and easy to install in that it only requires removal of the bumper and installation of the pulley 34 on the engine mainshaft 28 because the entire accessory is otherwise substantially self-contained.

We claim:

1. A vehicle comprising:
   a vehicle frame;
   a body on said frame;
   wheels for said frame;
   an engine resiliently mounted on said frame and having a mainshaft extending forwardly on said frame;
   a pulley on said mainshaft;
   a frame extension and mounting platform rigidly secured to said frame at the forward end thereof, said platform being located forwardly of said body and below said mainshaft of said engine;
   a bumper secured to said frame extension and mounting platform at the forward end thereof;
   at least one power consuming device such as a pump or a compressor and having a shaft to be driven mounted on said platform between said body and said bumper;
   a transfer shaft rigidly mounted for rotation on said frame extension and mounting platform below said mainshaft of said engine;
   first means connecting said transfer shaft to the shaft to be driven of said devices(s);
   second means, including a belt, connecting said transfer shaft to said pulley to be driven thereby while allowing relative movement between the same as said engine moves on said frame; and
   means applying a biasing force to said belt to maintain the belt at a desired tightness regardless of movement of the engine on the frame.

2. The vehicle of claim 1 wherein said transfer shaft is located on the upper side of said platform.

3. The vehicle of claim 1 wherein said transfer shaft is located generally medially of said platform and there are at least two said devices, one on each side of said transfer shaft.

4. The vehicle of claim 1 wherein said biasing means comprises an arm movably mounted in proximity to said belt and having, a portion movable toward and away from said belt, an idler pulley journaled on said portion and engaging said belt; resilient means biasing said portion toward said belt; and a dashpot connected to said arm.

5. The vehicle of claim 4 wherein said arm is movably mounted by a pivot intermediate its ends and said portion is one of said ends, said resilient means and said dashpot being connected to said arm on the side of the pivot remote from said portion.

6. The vehicle of claim 5 wherein a mounting plate is secured to said frame extension and mounting platform near its rearmost side and said pivot mounts said arm to said mounting plate, said dashpot and said resilient means interconnecting said arm and said mounting plate.

7. An accessory for attachment to the front end of a vehicle frame between the vehicle bumper and the main portion of the vehicle for mounting an engine driven component to the vehicle, said accessory comprising:
   a frame extension and mounting platform having a front end and a rear end;
   first means at said rear end for mounting said frame extension and mounting platform to the front of a vehicle frame;
   second means at said front end for securing a vehicle bumper to said frame extension and mounting platform;
   third means intermediate said ends for mounting at least one engine driven component to said frame extension and mounting platform;
   said frame extension and mounting platform being located forwardly of the main portion of the vehicle and below said mainshaft of said engine;
   a transfer shaft rigidly mounted on said frame extension and mounting platform, said transfer shaft having an axis directed generally from front to rear of said frame extension and mounting platform, said transfer shaft being mounted below a mainshaft of an engine of the vehicle;
   bearings on said frame extension and mounting platform journaling said transfer shaft for rotation about said axis;
   a transfer pulley mounting the transfer shaft near said rear end and adapted to be connected by a belt to said mainshaft of said engine to be driven thereby;
   means on said transfer shaft for connecting the same to an input for an engine driven component; and
   means on said frame extension and mounting platform near said rear end and in alignment with said transfer pulley for providing a biasing force to the belt connected to said pulley.

8. An accessory for attachment to the front end of a vehicle frame between the vehicle bumper and the main portion of the vehicle for mounting an engine driven component to the vehicle, said accessory comprising:
   a frame extension and mounting platform having a front end and a rear end, said frame extension and mounting platform being generally U-shaped having a lower bight flanked by upstanding legs;
   first means at said rear end for mounting said frame extension and mounting platform to the front of a vehicle frame;
   second means at said front end for securing a vehicle bumper to said frame extension and mounting platform;
   third means intermediate said ends for mounting at least one engine driven component to said frame extension and mounting platform;

a transfer shaft having an axis directed generally from front to rear of said frame extension and mounting platform;

bearings on said frame extension and mounting platform journaling said transfer shaft for rotation about said axis;

a transfer pulley mounting the transfer shaft near said rear end and adapted to be connected by a belt to an engine to be driven thereby;

means on said transfer shaft for connecting the same to an input for an engine driven component; and means on said frame extension and mounting platform near said rear side and in alignment with said transfer pulley for providing a biasing force to the belt connected to said pulley.

9. The accessory of claim 8 wherein said first and second mounting means are located on said legs and said third mounting means is located on said bight.

10. The accessory of claim 8 wherein said bearings are mounted on said bight generally medially of said legs and between sets of said third mounting means.

11. The accessory of claim 7 wherein said biasing force providing means includes a movably mounted idler pulley adapted to engage a belt, a spring for biasing said idler pulley generally toward said transfer pulley and dashpot.

12. The accessory of claim 8 further including a mounting plate secured to said bight near said rear side to extend upwardly therefrom and wherein said biasing force providing means comprises an idler pulley, means mounting said idler pulley on said mounting plate for movement toward and away from said transfer pulley, and spring means for biasing said idler pulley toward said transfer pulley.

13. The accessory of claim 12 further including a dashpot interconnecting said mounting plate and said idler pulley.

14. The accessory of claim 13 further including an arm pivoted to said mounting plate intermediate its ends, one of said ends journaling said idler pulley, said dashpot and said spring being connected to the other end of said arm and to said mounting plate.

* * * * *